ём
2,945,002

2,2'-DIHYDROXY-4,4'-DIMETHOXYBENZIL AS AN ULTRAVIOLET STABILIZER

James A. Van Allan, Rochester, N.Y., and John W. Tamblyn, Kingsport, Tenn., assignors to Eastman Kodak Company, Rochester, N.Y., a corporation of New Jersey No Drawing. Filed May 31, 1957, Ser. No. 662,567

7 Claims. (Cl. 260—45.95)

This invention concerns stabilizing organic plastics, resins, film-forming material, and the like to ultraviolet light. More particularly it concerns the use of 2,2'-dihydroxy-4,4'-dimethoxy-benzil as an ultraviolet stabilizer.

Many organic plastics, resins, film-forming materials and the like become colored, brittle, and eventually deteriorate when exposed to light. In order to vitiate the deleterious and damaging effect of sunlight upon these plastics and other materials, incorporation of stabilizers, such as, for example, resacetophenone, p-salicyloylphenol, 4,4'-dihydroxybenzophenone and the like have been suggested.

However, while the foregoing inhibit physical breakdown of the plastics, none of them is wholly satisfactory as a protective material against ultraviolet discoloration; i.e., colorless plastics, resins, and the like containing these materials become colored upon continued exposure to light. Other materials such as 4-benzoyl resorcinol and 4,4'-dimethoxy - 2,2'-dihydroxybenzophenone overcome the discoloration but at the same time, impart a yellowish cast to the film.

One object of this invention is to provide an ultraviolet stabilizer which protects organic plastics against ultraviolet discoloration. Another object is to provide an ultraviolet stabilizer which has the advantage of being colorless when incorporated into the plastic material. A further object is to provide a material which can be incorporated into organic plastics, resins, film-forming material and the like to prevent the materials from becoming brittle and eventually deteriorating when exposed to ultraviolet light.

We have found that 2,2'-dihydroxy 4,4'-dimethoxybenzil is effective in stabilizing organic plastics and the like against ultraviolet breakdown and discoloration and has the added advantage of being colorless when incorporated in the plastic.

The following examples are illustrative of our invention but are not intended to limit it in any way:

EXAMPLE 1

Film 3 mils thick was cast from a tetrachloroethane dope of a polyester made from 1,5-pentanediol and an Table I

| Stabilizer | Exposure Time in Hours Required for Embrittlement | Color of Film |
| --- | --- | --- |
| None | 100 | colorless. |
| Phenyl salicylate | 100 | Do. |
| Resacetophenone | 150 | Do. |
| Resorcinol monobenzoate | 200 | Do. |
| Benzophenone | 70 | Do. |
| 2-Hydroxy benzophenone | 100 | Do. |
| 4-Hydroxy benzophenone | 70 | light tan. |
| 4-Benzoyl resorcinol | 500 | yellow. |
| 2-Hydroxy-4-methoxy benzophenone | 800 | light yellow. |
| 2-Hydroxy-4,4'-dimethoxy benzophenone | 1,000 | Do. |
| 2,2-Dihydroxy-4,4'-dimethoxy benzophenone | 700 | yellow-brown. |
| Benzil | 100 | colorless. |
| 2,2'-Dihydroxy benzil | 100 | yellow. |
| 2,2'-Dihydroxy-4,4'-dimethoxy benzil | 1,000 | colorless. | equimolar mixture of sebacic acid and p,p'-dicarboxy diphenyl sulfone. This was exposed in an Atlas Twin-Arc Weather-Ometer, containing twelve 20-watt Westinghouse fluorescent sun lamps in addition to the two carbon arcs, until it became brittle enough to break when creased once, the exposed side of the film being on the outside of the crease. Similar films were made from dopes containing 5 parts by weight, based on 100 parts of the polyester, of various stabilizers. Table I records the exposure times required to embrittle the films. The colors of the films are also listed in the table.

The 2,2'-dihydroxy-4,4'-dimethoxy benzil was thus the only good colorless stabilizer.

Following is the preparation of 2,2'-dihydroxy-4,4' dimethoxybenzil:

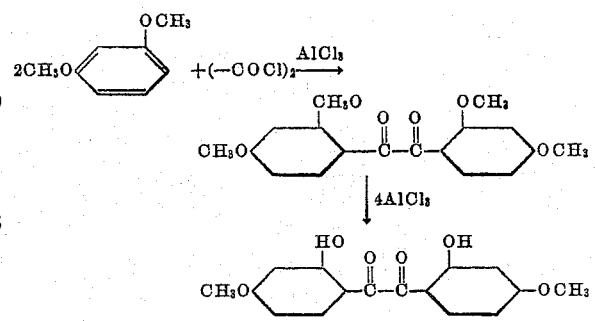

A solution of 6.0 g. (0.02 mole) of 2,2',4,4'-tetramethoxybenzil and 80 ml. of ethylene chloride was treated with 11 g. of aluminum chloride. The mixture was heated on the steam bath for two hours and decomposed with cold dilute hydrochloric acid. The organic layer was separated and extracted with 10% sodium hydroxide solution. Acidification of the alkaline phase produced a white precipitate which was collected on a filter and dried; the yield was 6.0 g., M.P. 136–139° C. One crystallization from butanol gave 4 g. and raised the M.P. to 149–150° C.

Other organic plastic materials may also be stabilized against ultraviolet deterioration by incorporating 2,2'-dihydroxy-4,4'-dimethoxy benzil in the material. These include cellulose derivatives, such as cellulose ethers such as ethyl cellulose, cellulose esters such as cellulose acetate and cellulose acetate butyrate, polyesters, vinyl polymers, and the like.

The preferred embodiment of our invention is the use of 0.5–5% of the stabilizer in the organic plastic material, although concentrations in the ranges 0.1–0.5% and 5–10% are useful in special applications.

We claim:

1. A polyester made from 1,5-pentanediol, sebacic acid and p,p'-dicarboxy diphenyl sulfone containing 0.1–10% of 2,2'-dihydroxy-4,4'-dimethoxybenzil.

2. A cellulose ester containing 0.1–10% of 2,2'-dihydroxy-4,4'-dimethoxybenzil.

3. A vinyl polymer containing 0.1–10% of 2,2'-dihydroxy-4,4'-dimethoxybenzil.

4. A cellulose ether containing 0.1–10% of 2,2'-dihydroxy-4,4'-dimethoxybenzil.

5. A cellulose acetate composition containing 0.1–10% of 2,2'-dihydroxy-4,4'-dimethoxybenzil.

6. A cellulose acetate butyrate composition containing 0.1–10% of 2,2'-dihydroxy-4,4'-dimethoxybenzil.

7. An ethyl cellulose composition containing 0.1–10% of 2,2'-dihydroxy-4,4'-dimethoxybenzil.

References Cited in the file of this patent

UNITED STATES PATENTS

| 2,693,492 | Hoch | Nov. 2, 1954 |
| 2,777,828 | Day et al. | Jan. 15, 1957 |